United States Patent [19]

Hsu et al.

[11] Patent Number: 5,652,310
[45] Date of Patent: Jul. 29, 1997

[54] RUBBERS HAVING IMPROVED INTERACTION WITH SILICA

[75] Inventors: Wen-Liang Hsu, Cuyahoga Falls; Adel Farhan Halasa, Bath, both of Ohio

[73] Assignee: The Goodyear Tire & Rubber Company, Akron, Ohio

[21] Appl. No.: 619,901

[22] Filed: Mar. 20, 1996

[51] Int. Cl.$^6$ .................................................. C08F 36/00
[52] U.S. Cl. ............................... 525/331.9; 525/332.3; 525/332.4; 525/333.1
[58] Field of Search ..................... 525/331.9, 332.3, 525/332.4, 333.1

[56] References Cited

U.S. PATENT DOCUMENTS

| | | | |
|---|---|---|---|
| 5,225,493 | 7/1993 | Marchand et al. | 525/314 |
| 5,521,255 | 5/1996 | Roy | 525/342 |

*Primary Examiner*—Edward J. Cain
*Attorney, Agent, or Firm*—Alvin T. Rockhill

[57] ABSTRACT

The subject invention discloses a process for modifying a rubbery polymer to improve silica interaction which comprises the steps of: (1) metallating the rubbery polymer with lithium by reacting the rubbery polymer with an organo lithium compound in the presence of a member selected from the group consisting of alkali metal alkoxides, alkali metal phenoxides and chelating tertiary alkyl 1,2- ethylene dieumines to produce a metallated rubbery polymer; and (2) reacting the metallated rubbery polymer with a silicon containing compound to produce the modified rubbery polymer having improved silica interaction, wherein the silicon containing compound is selected from the group consisting of silanes and siloxanes, wherein said silanes and siloxanes contain at least two functional groups which can be the same or different and which are selected from the group consisting of alkoxy groups, tertiary amino groups, cyano groups, sulfonyl groups, epoxy groups and halogen atoms; and wherein the reaction between the metallated rubbery polymer and the silicon containing compound is conducted in the presence of a member selected from the group consisting of alkali metal alkoxides, alkali metal phenoxides and chelating tertiary alkyl 1,2-ethylene diamines.

21 Claims, No Drawings

RUBBERS HAVING IMPROVED INTERACTION WITH SILICA

BACKGROUND OF THE INVENTION

Carbon black has been utilized as a filler in tire rubber compounds since the beginning of the tire industry. In fact, carbon black has traditionally been employed as a filler in virtually all tires for automobiles, trucks, airplanes, agricultural equipment and other applications. However, the use of silica fillers in high performance tires has received a great deal of recent attention. This is because silica fillers can provide unique benefits in high performance tire applications.

Unlike carbon black, silica filler is a polar material. Because it is polar in nature, silica filler does not mix very well with nonpolar hydrocarbons elastomers, such as those commonly used in vehicle tires. This lack or interaction or incompatibility between the silica filler and the rubber typically causes a lower level of tensile strength and wear resistance than is usually experienced with similar rubbers which contain carbon black filler. The most common approach for dealing this problem is to include a silica coupling agent in rubber compositions which utilize silica fillers.

Silica coupling agents typically link the silica filler to the rubber by covalently bonding with both the silica filler and the rubber. For instance, hydrolyzable triethoxysilyl moieties of the coupling agent can react with the silica filler while vulcanizable tetra-sulfur linkages in the coupling agent react with the rubber. A widely utilized silica coupling agent is bis-(3-triethoxysilylpropyl) tetrasulfide, which is also known as Si69. Generally, a large excess of silica coupling agent (more than 6 parts per hundred parts of rubber) is required to attain the desired results.

SUMMARY OF THE INVENTION

The subject invention discloses several techniques for improving the compatibility between silica fillers and rubbery polymers. By utilizing these techniques, the interaction between the silica filler and the rubber is greatly enhanced.

The subject invention more specifically discloses a process for modifying a rubbery polymer to improve silica interaction which comprises the steps of: (1) metallating the rubbery polymer with lithium by reacting the rubbery polymer with an organo lithium compound in the presence of a member selected from the group consisting of alkali metal alkoxides, alkali metal phenoxides and chelating tertiary alkyl 1,2-ethylene diamines to produce a metallated rubbery polymer; and (2) reacting the metallated rubbery polymer with a silicon containing compound to produce the modified rubbery polymer having improved silica interaction, wherein the silicon containing compound is selected from the group consisting of silanes and siloxanes, wherein said silanes and siloxanes contain at least two functional groups which can be the same or different and which are selected from the group consisting of alkoxy groups, tertiary amino groups, cyano groups, sulfonyl groups, epoxy groups and halogen atoms; and wherein the reaction between the metallated rubbery polymer and the silicon containing compound is conducted in the presence of a member selected from the group consisting of alkali metal alkoxides, alkali metal phenoxides and chelating tertiary alkyl 1,2-ethylene diamines.

The subject invention further reveals a process for prepsring a wetting agent which is capable of improving the interaction between silica and rubbery polymers which comprises the steps of: (1) metallating a low molecular weight rubbery polymer with lithium by reacting the low molecular weight rubbery polymer with an organo lithium compound in the presence of a member selected from the group consisting of alkali metal alkoxides, alkali metal phenoxides and chelating tertiary alkyl 1,2-ethylene diamines to produce a metallated low molecular weight rubbery polymer; and (2) reacting the metallated low molecular weight rubbery polymer with a silicon containing compound to produce the wetting agent; wherein the silicon containing compound is selected from the group consisting of silanes and siloxanes, wherein said silanes and siloxanes contain at least two functional groups which can be the same or different and which are selected from the group consisting of alkoxy groups, tertiary amino groups, cyano groups, sulfonyl groups, epoxy groups and halogen atoms; and wherein the reaction between the metallated low molecular weight rubbery polymer and the silicon containing compound is conducted in the presence of a member selected from the group consisting of alkali metal alkoxides, alkali metal phenoxides and chelating tertiary alkyl 1,2-ethylene diamines.

The present invention also discloses a rubbery blend which is comprised of a rubbery polymer and about 10 phr to about 250 phr of a silica filler; wherein the rubbery polymer was made by a process comprising the steps of (1) metallating the rubbery polymer with lithium by reacting the rubbery polymer with an organo lithium compound in the presence of a member selected from the group consisting of alkali metal alkoxides, alkali metal phenoxides and chelating tertiary alkyl 1,2-ethylene diamines to produce a metallated rubbery polymer; and (2) reacting the metallated rubbery polymer with a silicon containing compound to produce the rubbery polymer having improved silica interaction, wherein the silicon containing compound is selected from the group consisting of silanes and siloxanes, wherein said silanes and siloxanes contain at least two functional groups which can be the same or different and which are selected from the group consisting of alkoxy groups, tertiary amino groups, cyano groups, sulfonyl groups, epoxy groups and halogen atoms; wherein the reaction between the metallated rubbery polymer and the silicon containing compound is conducted in the presence of a member selected from the group consisting of alkali metal alkoxides, alkali metal phenoxides and chelating tertiary alkyl 1,2-ethylene diamines.

The subject invention further reveals a pneumatic tire having an outer circumferential tread wherein said tread is a sulfur-cured rubber composition which is comprised of a modified rubbery polymer and about 10 phr to about 250 phr of a silica filler; wherein the modified rubbery polymer was made by a process comprising the steps of (1) metallating a rubbery polymer with lithium by reacting the rubbery polymer with an organo lithium compound in the presence of a member selected from the group consisting of alkali metal alkoxides, alkali metal phenoxides and chelating tertiary alkyl 1,2-ethylene diamines to produce a metallated rubbery polymer; and (2) reacting the metallated rubbery polymer with a silicon containing compound to produce the modified rubbery polymer having improved silica interaction, wherein the silicon containing compound is selected from the group consisting of silanes and siloxanes, wherein said silanes and siloxanes contain at least two functional groups which can be the same or different and which are selected from the group consisting of alkoxy groups, tertiary amino groups, cyano groups, sulfonyl groups, epoxy groups and halogen atoms; and wherein the reaction between the metallated rubbery polymer and the silicon containing compound is conducted in the presence of a member selected from the group consisting of alkali metal alkoxides, alkali metal phenoxides and chelating tertiary alkyl 1,2-ethylene diamines.

DETAILED DESCRIPTION OF THE INVENTION

The techniques of the subject invention can be used to modify rubbery polymers to make them more compatible with silica fillers. Wetting agents which can be blended with rubbery polymers to improve their interaction with silica fillers can also be made utilizing the techniques of this invention.

The process of this invention can be used to modify virtually any rubbery polymer which contains double bonds. Such rubbery polymers will typically be comprised of repeat units which are derived from one or more conjugated diolefin monomers. Such rubbers can also contain repeat units which are derived from other monomers which are copolymerizable with conjugated diolefin monomers. For instance, the rubbery polymer can also contain repeat units which are derived from vinyl aromatic monomers, such as styrene. Polybutadiene rubber, polyisoprene rubber, styrene-butadiene rubber, isoprene-butadiene rubber, styrene-isoprene rubber and styrene-isoprene-butadiene rubber are some representative examples of rubbery polymers which can be modified utilizing the techniques of this invention.

The wetting agents of this invention are made by modifying low molecular weight rubbery polymers of conjugated diolefin monomers. These low molecular weight rubbery polymers will also typically be comprised of repeat units which are derived from one or more conjugated diolefin monomers. Such low molecular weight rubbers can also, of course, contain repeat units which are derived from other monomers which are copolymerizable with conjugated diolefin monomers. For instance, the low molecular weight rubbery polymer can contain repeat units which are derived from vinyl aromatic monomers, such as styrene. Low molecular weight polybutadiene rubber, low molecular weight polyisoprene rubber, low molecular weight styrene-butadiene rubber, low molecular weight isoprene-butadiene rubber, low molecular weight styrene-isoprene rubber and low molecular weight styrene-isoprene-butadiene rubber are some representative examples of low molecular weight rubbery polymers which can be modified to make the wetting agents of this invention. The low molecular weight rubbery polymer will typically have a number average molecular weight which is within the range of about 1000 to about 25,000. The low molecular weight rubbery polymer will more typically have a number average molecular weight which is within the range of about 2000 to about 15,000.

The technique of this invention involves modifying rubbers or low molecular weight rubbery polymers (to make wetting agents) utilizing a two-step process. In the first step, the polymer is metallated with lithium and, in the second step, the metallated polymer is reacted with a silane or siloxane to make the modified polymer or wetting agent. This two-step process is normally conducted in an inert organic solvent.

The inert organic medium which is utilized as the solvent will typically be a hydrocarbon which is liquid at ambient temperatures which can be one or more aromatic, paraffinic or cycloparaffinic compounds. These solvents will normally contain from 4 to 10 carbon atoms per molecule and will be liquids under the conditions of the process. It is, of course, important for the solvent selected to be inert. The term "inert" as used herein means that the solvent does not interfere with the reaction or react with the polymers made thereby. Some representative examples of suitable organic solvents include pentane, isooctane, cyclohexane, normal hexane, benzene, toluene, xylene, ethylbenzene and the like, alone or in admixture. Saturated aliphatic solvents, such as cyclohexane and normal hexane, are most preferred.

In cases where the rubbery polymer was synthesized by an anionic polymerization process utilizing a lithium initiator system, it is preferable to use the living lithium terminated polymer in the modification procedure of this invention before shortstopping the polymerization. This is because the living lithium end group on the polymer is capable of reacting with the silane or siloxane in the second step of the process of this invention. Even though it is preferred to use rubbers with the live lithium end groups, any rubbery polymer can be metallated and modified utilizing the techniques of this invention.

In any case, the rubbery polymer is metallated with lithium by reacting the rubbery polymer with an organo lithium compound in the presence of at least one member selected from the group consisting of alkali metal alkoxides, alkali metal phenoxides and chelating tertiary alkyl 1,2-ethylene diamines. Generally, from about 1 phr to 5 phr (parts per 100 parts by weight of rubber) of the organo-lithium compound will be used to metallate the rubbery polymer. The organo lithium compound can be an alkyl lithium compound which is represented by the formula R—Li, wherein R represents a hydrocarbyl radical containing from 1 to about 20 carbon atoms. Generally, such monofunctional organolithium compounds will contain from 1 to about 10 carbon atoms. Some representative examples of organo lithium compounds which can be employed include methyllithium, ethyllithium, isopropyllithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4- butylphenyllithium, p-tolyllithium, 4-phenylbutyllithium, cyclohexyllithium, 4-butylcyclohexyllithium and 4-cyclohexylbutyllithium. Some representative examples of preferred organo lithium compounds that can be utilized include ethyllithium, isopropyllithium, n-butyllithium, secondary-butyllithium, normal-hexyllithium, tertiary-octyllithium, phenyllithium, 2-napthyllithium, 4-butylphenyllithium, 4-phenylbutyllithium, cyclohexyllithium and the like. Normal-butyllithium and secondary-butyllithium are highly preferred organo lithium compounds.

It is preferred to employ an alkali metal alkoxide or an alkali metal phenoxide rather than a tertiary chelating alkyl 1,2-ethylene diamine, such as TMEDA. The alkali metal in the alkali metal alkoxide can be sodium, potassium, rubidium or cesium. It is typically preferred for the alkali metal to be potassium or sodium. The alkali metal alkoxide will typically contain from about 2 to about 12 carbon atoms. It is generally preferred for the alkali metal alkoxide to contain from about 3 to about 8 carbon atoms. It is generally most preferred for the alkali metal alkoxide to contain from about 4 to about 6 carbon atoms. Potassium t-amyloxide (potassium t-pentoxide) and sodium t-aamyloxide (sodium-pentoxide) are highly preferred alkali metal alkoxides which can be utilized in the metallation step of the process of this invention. The alkali metal phenoxide can be a substituted phenoxide containing from 7 to about 20 carbon atoms.

The molar ratio of the alkali metal alkoxide, alkali metal phenoxide or chelating tertiary alkyl 1,2-ethylene diamine to the organo lithium compound will normally be within the range of about 0.5:1 to about 100:1. However, molar ratios of greater than 10:1 are not practical because of economic factors. The molar ratio of alkali metal alkoxide, alkali metal phenoxide or chelating tertiary alkyl 1,2-ethylene diamine to the organo lithium compound will preferably be within the range of 1:1 to about 5:1. It is most preferred for this molar ratio to be within the range of about 1:1 to about 2:1.

The metallation reaction will normally be conducted at a temperature which is within the range of about 20° to about 100° C. in cases where a chelating tertiary alkyl 1,2-ethylene diamine, such as TMEDA, is employed. In such cases, it is typically preferred for the metallation reaction to be conducted at a temperature which is within the range of about 40° C. to 90° C. with temperatures which are within the range of about 50° C. to 65° C. being most preferred. In cases where an alkali metal alkoxide is utilized, the reaction between the unsaturated hydrocarbon and the alkyl lithium compound will normally be carried out at a temperature which is within the range of about 60° C. and 250° C. In such cases, it is preferred for this reaction to be conducted at a temperature which is within the range of about 80° C. to 200° C. with temperatures within the range of 100° C. to 150° C. being most preferred.

After the rubbery polymer has been metallated, it is subsequently reacted with a silicon containing compound. The silicon containing compound will either be a silane or a siloxane. In either case, the silane or the siloxane contains at least two functional groups which can be the same or different and which are selected from alkoxy groups, tertiary amino groups, cyano groups, sulfonyl groups, epoxy groups and halogens. These functional groups can be bonded directly or indirectly to the silicon atoms in the silicon containing compound. Approximately one mole of the silicon containing compound will be added to the metallated rubbery polymer per mole of lithium atoms bound to the rubbery polymer by the metallation step. It is, of course, possible to utilize greater or lesser amounts of the silicon containing compound, but doing so is not beneficial and is wasteful from an economic standpoint. The silicon containing compound will typically be reacted with the metallated rubbery polymer at a temperature which is within the range of about 20° to about 50° C.

The alkoxy groups which can be in the silicon containing compound will typically contain from 1 to about 10 carbon atoms and will accordingly be of the structural formula —OR, wherein R represents an alkyl group containing from 1 to about 10 carbon atoms. In most cases, the alkoxy group will contain from 1 to about 4 carbon atoms, with methoxy groups and ethoxy groups being highly preferred.

The tertiary amino groups which can be in the silicon containing compound are of the structural formula:

wherein $R^1$ and $R^2$ represent alkyl groups which contain from 1 to about 10 carbon atoms. $R^1$ and $R^2$ will typically represent alkyl groups which contain from 1 to about 5 carbon atoms. It is most typical for $R^1$ and $R^2$ to represent methyl groups, ethyl groups, normal-propyl groups, isopropyl groups, normal butyl groups, isobutyl groups or tertiary butyl groups.

The sulfonyl groups which can be in the silicon containing compound are of the structural formula:

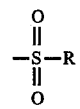

wherein R represents an alkyl group containing from 1 to about 10 carbon atoms or a halogen atom. The halogen atom will typically be fluorine, chlorine, bromine or iodine with fluorine and chlorine being most typical. In cases where R represents an alkyl group, it will typically contain from 1 to about 5 carbon atoms with methyl groups, ethyl groups, normal-propyl groups, isopropyl groups, normal butyl groups, isobutyl groups and tertiary butyl groups being representative examples.

The silanes which can be utilized have the structural formula:

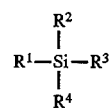

wherein $R^1$ and $R^2$ can be the same or different and are selected from the group consisting of alkoxy groups, tertiary amino groups, cyano groups, sulfonyl groups, epoxy groups and halogen atoms; and wherein $R^3$ and $R^4$ can be the same or different and are selected from the group consisting of alkoxy groups, tertiary amino groups, cyano groups, sulfonyl groups, epoxy groups and halogen atoms, alkyl groups, aryl groups and alkaryl groups. In many cases, $R^1$ and $R^2$ are selected from the group consisting of alkoxy groups and halogen atoms; and $R^3$ and $R^4$ are selected from the group consisting of alkoxy groups, halogen atoms, alkyl groups, aryl groups, alkaryl groups and sulfur containing radicals. It is normally preferred for $R^1$, $R^2$, $R^3$ and $R^4$ to be alkoxy groups or halogen atoms. For instance, $R^1$, $R^2$ and $R^3$ could be alkoxy groups with $R^4$ being a halogen. In another preferred scenario, $R^1$, $R^2$, $R^3$ and $R^4$ could all be alkoxy groups. The siloxanes which can be utilized have the structural formula:

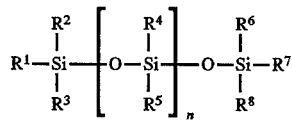

wherein $R^1$, $R^2$, $R^3$, $R^4$, $R^5$, $R^6$, $R^7$ and $R^8$ can be the same or different and are selected from the group consisting of alkoxy groups, tertiary amino groups, cyano groups, sulfonyl groups, epoxy groups, halogen atoms, alkyl groups, aryl groups and alkaryl groups; and wherein at least two of $R^1$, $R^2$, $R^3$, $R^4$, $R^5$, $R^6$, $R^7$ and $R^8$ are functional groups which can be the same or different and are selected from the group consisting of alkoxy groups, tertiary amino groups, cyano groups, sulfonyl groups, epoxy groups and halogen atoms. It is normally preferred for $R^1$, $R^2$, $R^3$, $R^4$ $R^5$, $R^6$, $R^7$ and $R^8$ to be alkoxy groups or halogen atoms. For instance, $R^1$, $R^2$, $R^3$, $R^4$, $R^5$, $R^6$, $R^7$ and $R^8$ could all be alkoxy groups or could all be halogen atoms.

After the modification of the rubbery polymer has been completed, it can be recovered from the organic solvent. The rubbery polymer can be recovered from the organic solvent by any means, such as decantation, filtration, centrification and the like. It is often desirable to precipitate the rubbery polymer from the organic solvent by the addition of lower alcohols containing from about 1 to about 4 carbon atoms to the polymer solution. Suitable lower alcohols for precipitation of the diblock rubber from the polymer cement include methanol, ethanol, isopropyl alcohol, normal-propyl alcohol and t-butyl alcohol. The utilization of lower alcohols to precipitate the rubbery polymer from the polymer cement also "kills" the living polymer by inactivating remaining lithium end groups. After the rubbery polymer is recovered from the solution, steam-stripping can be employed to reduce the level of volatile organic compounds in the rubbery polymer.

There are valuable benefits associated with utilizing the rubbery polymers of this invention in making tire tread compounds which utilize silica fillers. In any case, the rubbery polymers of this invention can be compounded utilizing conventional ingredients and standard techniques. For instance, the rubbery polymers of this invention will typically be blended with a silica filler, sulfur, additional fillers (such as carbon black), accelerators, oils, waxes, scorch inhibiting agents, coupling agents and processing aids. In most cases, the rubbery polymers will be compounded with sulfur and/or a sulfur containing compound, a silica filler, at least one accelerator, at least one antidegradant, at least one processing oil, zinc oxide, optionally a tackifier resin, optionally a reinforcing resin, optionally one or more fatty acids, optionally a peptizer, optionally carbon black and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally from 10 to 150 phr of at least one silica filler will be utilized in the blend with 30 to 80 phr being preferred. In most cases, at least some carbon black will be utilized with the silica in the filler formulation. The filler can, of course, be comprised totally of silica. The silica filler, of course, improves tear resistance and heat build-up characteristics of tires. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the tread compound blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The rubbery polymer containing blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers and 0 to 1 phr of scorch inhibiting agents.

The processing of the silica containing rubber blends is normally conducted in the presence of a sulfur containing organosilicon compound to realize maximum benefits. However, it is not necessary to include such organosilicon containing compounds in compounding the rubbery polymers of this invention because they already exhibit excellent compatibility with silica fillers. In fact, the techniques of this invention eliminate the need for such organosilicon compounds. However, organosilicon compounds can be included in compounding the rubbery polymers of this invention. Examples of suitable sulfur containing organosilicon compounds are of the formula:

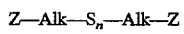  (I)

in which Z is selected from the group consisting of

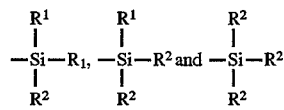

where $R^1$ is an alkyl group of 1 to 4 carbon atoms, cyclohexyl or phenyl; wherein $R^2$ is alkoxy of 1 to 8 carbon atoms, or cycloalkoxy of 5 to 8 carbon atoms; and wherein Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis (triethoxysilylpropyl) octasulfide, 3,3'-bis (trimethoxysilylpropyl) tetrasulfide, 2,2'-bis (triethoxysilylethyl) tetrasulfide, 3,3'-bis (trimethoxysilylpropyl) trisulfide, 3,3'-bis (triethoxysilylpropyl) trisulfide, 3,3'-bis (tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis (dimethyl methoxysilylethyl) disulfide, 2,2'-bis(dimethyl sec.butoxysilylethyl) trisulfide, 3,3'-bis(di t-butylethoxysilylpropyl) tetrasulfide, 3,3'-bis(dimethhyl butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18, 18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-his (dimethoxymethylsilylpentyl) trisulfide, 3,3'-bis (trimethoxysilyl-2-methylpropyl) tetrasulfide and 3,3'-bis (dimethoxyphenylsilyl-2- methylpropyl) disulfide.

Some sulfur containing organosilicon compounds which are generally considered to be preferred include 3,3'-bis (trimethoxy or triethoxy silylpropyl) sulfides. The most preferred organosilicon compound is generally deemed to be 3,3'-bis(triethoxysilylpropyl) tetrasulfide. Therefore as to formula I, preferably Z is

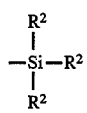

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The rubber composition should contain a sufficient amount of silica, and carbon black, if used, to contribute a reasonably high modulus and high resistance to tear. The silica filler may be added in amounts ranging from about 10 phr to about 250 phr. Preferably, the silica is present in an amount ranging from about 50 phr to about 120 phr. If carbon black is also present, the amount of carbon black, if used, may vary. Generally speaking, the amount of carbon black will vary from about 5 phr to about 80 phr. Preferably, the amount of carbon black will range from about 10 phr to about 40 phr. It is to be appreciated that the silica coupler may be used in conjunction with a carbon black, namely pre-mixed with a carbon black prior to addition to the rubber composition, and such carbon black is to be included in the aforesaid amount of carbon black for the rubber composition formulation. In any case, the total quantity of silica and carbon black will be at least about 30 phr. The combined weight of the silica and carbon black, as hereinbefore referenced, may be as low as about 30 phr, but is preferably from about 45 to about 130 phr.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc with, for example, designations of Z1165 MP and Z165 GR and silicas available from Degussa AG with, for example, designations VN2 and VN3.

Tire tread formulations which include silica and an organosilicon compound will typically be mixed utilizing a thermomechanical mixing technique. The mixing of the tire tread rubber formulation can be accomplished by methods known to those having skill in the rubber mixing art. For example, the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur containing organosilicon, and carbon black if used, are mixed in one or more non-productive mix stages. The terms "non-productive" and "productive" mix stages are well known to those having skill in the rubber mixing art. The sulfur vulcanizable rubber composition containing the sulfur containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The rubbery polymers of this invention can be used in tire treads in conjunction with ordinary tire manufacturing techniques. Tires are built utilizing standard procedures with the rubbery polymer simply being substituted for the conventional rubber compounds typically used as the tread rubber. In the alternative, a wetting agent made by modifying a low molecular weight polymer can be blended into the rubber blend to improve interaction with silica fillers. Typically, from about 5–30 phr of the wetting agent will be added to tire rubber formulations. It is normally preferred to add 7–12 phr of such low molecular weight polymeric wetting agents to tire rubber formulations. In any case, after the tire has been built with the modified rubbery polymer or the wetting agent in the rubber blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C (290° F.) to about 154° C. (310° F.). It is generally preferred for the cure cycle used to vulcanize the tires of this invention to have a duration of about 10 to about 20 minutes with a cure cycle of about 12 to 18 minutes being most preferred.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

In this experiment, a 50/50 IBR (isoprene-butadiene rubber) containing six $C_3H_6Si(OEt)_3$ functionalities was prepared. First, 2,300 grams of 19.7 weight percent isoprene/1,3-butadiene mixture was premixed in hexane. The ratio of isoprene to 1,3-butadiene was 50/50. This material was dried with silica/alumina/molecular sieve/NaOH and was charged into a one-gallon (3.8 liters) reactor. After the impurity of the premix was removed by an n-BuLi (n-butyl lithium) solution, 1.50 ml of a 1.0M solution of ethyltetrahydrofurfuryl ether (in hexane) and 1.44 ml of a 1.04M solution of n-BuLi (in hexane) was added to the reactor. The target number average molecular weight was 300,000. The polymerization was allowed to proceed at 70° C. for 2.5 hours. The GC (gas chromatography) analysis of the residual monomers contained in the polymerization mixture indicated that the polymerization was complete at this time. Subsequently, 4.5 mmoles of TMEDA (tetramethylethylenediamine) and 7.6 mmoles of N-BuLi were added to the reaction mixture to metallate the resulting IBR backbones. The amount of N-BuLi used would litlate five carbons in the IBR chains, based on the following calculation:

$$N \times \frac{\text{Total polymer weight}}{\text{Mn of polymer}} = 5 \times \frac{2300 \times .197}{300,000} = 9.0 \text{ mmoles}$$

where N is the number of metallation on the IBR backbones.

The metallation was allowed to proceed at 70° C. for two hours which was followed by functionalization by adding 11.0 ml of 1M solution of $Si(OEt)_3C_3H_6Cl$ (in hexane). The amount of $Si(OEt)_3C_3H_6Cl$ used was six molar quantity to N-BuLi used (for five litiated backbones and one live chain end). The reaction was continued for an additional 30 minutes at the same temperature. The resulting multi-functionalized IBR was then stabilized with 1 phm of antioxidant. After evaporating hexane, the recovered polymer was dried in a vacuum oven at 50° C. The IBR produced was determined to have a Tg (glass transition temperature) at −45° C. and a Mooney viscosity of 76. It was also determined to have a microstructure which contained 25 percent 1,2-polybutadiene units, 26 percent 1,4-polybutadiene units, 1 percent 1,2-polyisoprene units, 27 percent 3,4-polyisoprene units and 21 percent 1,4-polyisoprene units.

EXAMPLES 2–3

Multi-functionalized IBRs containing other functional groups were also prepared. The procedures described in Example 1 was utilized in these examples except that the functionalizing agent was changed from $Si(OEt)_3C_3H_6CL$ (CH_3)_2SiHCl or Si69 (bis-(3-triethoxisilyl-propyl)-tetrasulfide). The Tgs, Mooney ML-4 viscosities and microstructures of the resulting polymers are listed in Table 1.

TABLE 1

| | | | | Microstructure (%) | | | | |
|---|---|---|---|---|---|---|---|---|
| Ex. No. | Functional group | Tg (°C.) | ML-4 | 1,2-PBd | 1,4-PBd | 1,2-PI | 3,4-PI | 1,4-PI |
| 1 | $C_3H_6Si(OEt)_3$ | −45 | 76 | 25 | 26 | 1 | 27 | 21 |
| 2 | $(CH_3)_2SiH$ | −44 | 80 | 26 | 25 | 1 | 28 | 20 |
| 3 | Si69 | −45 | 86 | 26 | 24 | 2 | 28 | 20 |

EXAMPLE 4

In this example, styrene-butadiene rubber (SBR) containing six $Bu_3Sn$ functionalities was prepared. First, 2,300 grams 19.5 weight percent styrene/1,3-butadiene mixture was premixed in hexane. The ratio of styrene to 1,3-butadiene was 10/90. This material was dried with silica/alumina/molecular sieve/NaOH and was charged into a one-gallon (3.8 liters) reactor. After the impurity of the premix was removed by a n-BuLi (n-butyl lithium) solution, 3.60 ml of a 1.0M solution of ethyltetrahydrofurfuryl ether (in hexane) and 1.73 ml of a 1.04M n-BuLi (in hexane) was added to the reactor. The target number average molecular weight was 250,000. The polymerization was allowed to proceed at 70° C. for 1 hour. The GC analysis of the residual monomers contained in the polymerization mixture indicated that the polymerization was complete at this time. Subsequently, 4.5 mmoles of TMEDA and 9.0 mmoles of n-BuLi were added to the reaction mixture to metallate the resulting SBR backbones. The amount of n-BuLi used would litlate five of carbons in the SBR chains. The metallation was allowed to proceed at 70° C. for two hours which was followed by functionalization by adding 10.8 ml of 1M solution of $Bu_3SnCl$ (in hexane). The amount of $Bu_3SnCl$ used was six molar quantity to n-BuLi used (for five litiated backbones and one live chain end). The reaction was continued for an additional 30 minutes at the same temperature. The resulting multi-functionalized SBR was then stabilized with 1 phm of antioxidant. After evaporating hexane, the recovered polymer was dried in a vacuum oven at 50° C. The SBR produced was determined to have a Tg at −41° C. and a Mooney viscosity of 92. It was also determined to have a microstructure which contained 62 percent 1,2-polybutadiene units, 29 percent 1,4-polybutadiene units and 9 percent polystyrene units.

EXAMPLES 5–9

Other multi-functionalized polymers containing six t-BuSN groups were also prepared. The procedure described in Example 4 was utilized in these examples except that the monomer(s) used was changed from stryene/1,3-butadiene to isoprene/1,3-butadiene, styrene/isoprene/1,3-butadiene, 1,3-butadiene or isoprene. The Tgs, ML-4s and microstructures of the resulting polymers are listed in Table 2.

TABLE 2

| | | | | Microstructure (%) | | | | | |
|---|---|---|---|---|---|---|---|---|---|
| Ex. No. | Functional group | Tg (°C.) | ML-4 | 1,2-PBd | 1,4-PBd | 1,2-PI | 3,4-PI | 1,4-PI | Sty |
| 4 | 10/90 SBR | −39 | 92 | 62 | 29 | — | — | — | 9 |
| 5 | 50/50 IBR | −45 | 78 | 26 | 25 | 1 | 28 | 20 | — |
| 6 | 70/30 IBR | −18 | 82 | 27 | 8 | 3 | 53 | 9 | — |
| 7 | 25/50/25 SIBR | −22 | 92 | 16 | 13 | 1 | 29 | 15 | 26 |
| 8 | HVPBd | −36 | 83 | 75 | 25 | — | — | — | — |
| 9 | 3,4-PI | −16 | 71 | — | — | 4 | 58 | 38 | — |

COMPARATIVE EXAMPLE 10

In this example, an unfunctionalized IBR was prepared for compounded property comparison studies. Then, 2,300 grams of 19.7 weight percent isoprene/1,3-butadiene mixture was premised in hexane. The ratio of isoprene to 1,3-butadiene was 50/50. This material was dried with silica/alumina/molecular sieve/NaOH and was charged into a one-gallon (3.8 liters) reactor. After the impurity of the premix was removed by an n-BuLi (n-butyl lithium) solution, 1.50 ml of a 1.0M solution of ethyltetrahydrofurfuryl ether (in hexane) and 1.44 ml of a 1.04M n-BuLi (in hexane) was added to the reactor. The target number average molecular weight was 300,000. The polymerization was allowed to proceed at 70° C. for 2.5 hours. The GC analysis of the residual monomers contained in the polymerization mixture indicated that the polymerization was complete at this time. After shortstopping the polymerization with ethanol, the resulting IBR was then stabilized with 1 phm of antioxidant. After evaporating hexane, the recovered polymer was dried in a vacuum oven at 50° C. The IBR produced was determined to have a microstructure which contained 25 percent 1,2-polybutadiene units, 26 percent 1,4-polybutadiene units, 1 percent 1,2-polyisoprene units, 26 percent 3,4-polyisoprene units and 22 percent 1,4-polyisoprene units.

COMPARATIVE EXAMPLE 11 in this example, a conventional chain end functionalized IBR which contained only one functional group at the polymer chain end was prepared. The procedures described in Example 10 was utilized except that one molar ratio (to n-BuLi) of Si(OEt)$_3$C$_3$H$_6$Cl was added the polymerization mixture at the end of polymerization (2.5 hours). The functionalization was allowed to proceed at 70° C. for an additional 30 minutes before the polymer was worked up as described in Example 10. The IBR produced was determined to have a microstructure which contained 24 percent 1,2-polybutadiene units, 26 percent 1,4-polybutadiene units, 3 percent 1,2-polyisoprene units, 27 percent 3,4-polyisoprene units and 21 percent 1,4-polyisoprene units.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process for modifying a rubbery polymer to improve silica interaction which comprises the steps of: (1) metallating the rubbery polymer with lithium by reacting the rubbery polymer with an organo lithium compound in the presence of a member selected from the group consisting of alkali metal alkoxides, alkali metal phenoxides and chelating tertiary alkyl 1,2-ethylene diamines to produce a metallated rubbery polymer; and (2) reacting the metallated rubbery polymer with a silicon containing compound to produce the modified rubbery polymer having improved silica interaction, wherein the silicon containing compound is selected from the group consisting of silanes and siloxanes, wherein said silanes and siloxanes contain at least two functional groups which can be the same or different and which are selected from the group consisting of alkoxy groups, tertiary amino groups, cyano groups, sulfonyl groups, epoxy groups and halogen atoms; and wherein the reaction between the metallated rubbery polymer and the silicon containing compound is conducted in the presence of a member selected from the group consisting of alkali metal alkoxides, alkali metal phenoxides and chelating tertiary alkyl 1,2-ethylene diamines.

2. A process for modifying a rubbery polymer to improve silica interaction as specified in claim 1 wherein the silicon containing is a silane having the structural formula:

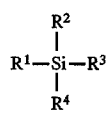

wherein R$^1$ and R$^2$ can be the same or different and are selected from the group consisting of alkoxy groups and halogen atoms, and wherein R$^3$ and R$^4$ can be the same or different and are selected from the group consisting of alkoxy groups, halogen atoms, alkyl groups, aryl groups, alkaryl groups and sulfur containing radicals.

3. A process for preparing a wetting agent which is capable of improving the interaction between silica and rubbery polymers which comprises the steps of: (1) metallating a low molecular weight rubbery polymer with lithium by reacting the low molecular weight rubbery polymer with an organo lithium compound in the presence of a member selected from the group consisting of alkali metal alkoxides, alkali metal phenoxides and chelating tertiary alkyl 1,2-ethylene diamines to produce a metallated low molecular weight rubbery polymer; and (2) reacting the metallated low molecular weight rubbbery polymer with a silicon containing compound to produce the wetting agent; wherein the silicon containing compound is selected from the group consisting of silanes and siloxanes, wherein said silanes and siloxanes contain at least two functional groups which can be the same or different and which are selected from the group consisting of alkoxy groups, tertiary amino groups, cyano groups, sulfonyl groups, epoxy groups and halogen atoms; and wherein the reaction between the metallated low molecular weight rubbery polymer and the silicon containing compound is conducted in the presence of a member selected from the group consisting of alkali metal alkoxides, alkali metal phenoxides and chelating tertiary alkyl 1,2-ethylene diamines.

4. A rubbery blend which is comprised of a rubbery polymer and about 10 phr to about 250 phr of a silica filler; wherein the rubbery polymer was made by a process comprising the steps of (1) metallating the rubbery polymer with lithiumby reacting the rubbery polymer with an organo lithium compound in the presence of a member seiected from the group consisting of alkali metal alkoxides, alkali metal phenoxides and chelating tertiary alkyl 1,2-ethylene diamines to produce a metallated rubbery polymer; and (2) reacting the metallated rubbery polymer with a silicon containing compound to produce the rubbery polymer having improved silica interaction, wherein the silicon containing compound is selected from the group consisting of silanes and siloxanes, wherein said silanes and siloxanes contain at least two functional groups which can be the same or different and which are selected from the group consisting of alkoxy groups, tertiary amino groups, cyano groups, sulfonyl groups, epoxy groups and halogen atoms; wherein the reaction between the metallated rubbery polymer and the silicon containing compound is conducted in the presence of a member selected from the group consisting of alkali metal alkoxides, alkali metal phenoxides and chelating tertiary alkyl 1,2-ethylene diamines.

5. A pneumatic tire having an outer circumferential tread wherein said tread is a sulfur-cured rubber composition which is comprised of a modified rubbery polymer and about 10 phr to about 250 phr of a silica filler; wherein the modified rubbery polymer was made by a process comprising the steps of (1) metallating a rubbery polymer with lithium by reacting the rubbery polymer with an organo lithium compound in the presence of a member selected from the group consisting of alkali metal alkoxides, alkali metal phenoxides and chelating tertiary alkyl 1,2-ethylene diamines to produce a metallated rubbery polymer; and (2) reacting the metallated rubbery polymer with a silicon containing compound to produce the modified rubbery polymer having improved silica interaction, wherein the silicon containing compound is selected from the group consisting of silanes and siloxanes, wherein said silanes and siloxanes contain at least two functional groups which can be the same or different and which are selected from the group consisting of alkoxy groups, tertiary amino groups, cyano groups, sulfonyl groups, epoxy groups and halogen atoms; and wherein the reaction between the metallated rubbery polymer and the silicon containing compound is conducted in the presence of a member selected from the group consisting of alkali metal alkoxides, alkali metal phenoxides and chelating tertiary alkyl 1,2-ethylene diamines.

6. The wetting agent made by the process specified in claim 3.

7. A rubbery blend which is comprised of at least one rubber, from about 10 phr to about 250 phr of a silica filler, and the wetting agent made by the process specified in claim 3.

8. A pneumatic tire having an outer circumferential tread wherein said tread is a sulfur-cured rubber composition which is comprised of a modified rubbery polymer, from about 10 phr to about 250 phr of a silica filler, and a wetting agent; wherein the wetting agent is made by the process specified in claim 3.

9. A process as specified in claim 1 wherein the organo lithium compound is an alkyl lithium compound which contains from 1 to about 10 carbon atoms.

10. A process as specified in claim 9 wherein the rubbery polymer is selected from the group consisting of polybutadiene rubber, polyisoprene rubber, styrene-butadiene rubber, isoprene-butadiene rubber, styrene-isoprene rubber and styrene-isoprene-butadiene rubber.

11. A process as specified in claim 10 wherein the member selected from the group consisting of alkali metal alkoxides, alkali metal phenoxides and chelating tertiary alkyl 1,2-ethylene diamines is an alkali metal alkoxide.

12. A process as specified in claim 11 wherein the alkali metal alkoxide contains from about 2 to about 12 carbon atoms, and wherein the alkali metal is selected from the group consisting of sodium, potassium, rubidium and cesium.

13. A process as specified in claim 11 wherein the alkali metal alkoxide contains from about 3 to about 8 carbon atoms, and wherein the alkali metal is selected from the group consisting of sodium and potassium.

14. A process as specified in claim 11 wherein the alkali metal alkoxide is selected from the group consisting of sodium t-amyloxide and potassium t-amyloxide.

15. A process as specified in claim 10 wherein the member selected from the group consisting of alkali metal alkoxides, alkali metal phenoxides and chelating tertiary alkyl 1,2-ethylene diamines is a chelating tertiary alkyl 1,2-ethylene diamnine.

16. A process as specified in claim 15 wherein the chelating tertiary alkyl 1,2ethylene diamine is N,N,N',N'-tetramethylethylenediamnine.

17. A process as specified in claim 1 wherein the silicon containing compound is a siloxane.

18. A process as specified in claim 15 wherein the metallation in step (1) is conducted at a temperature which is within the range of about the 40° C. to about 90° C.

19. A process as specified in claim 11 wherein the metallation in step (1) is conducted at a temperature which is within the range of about the 80° C. to about 200° C.

20. A process as specified in claim 1 wherein the rubbery polymer is metallated in step (1) with about 1 to about 5 phr of the organo lithium compound.

21. A rubbery blend as specified in claim 7 wherein the wetting agent is present in an amount which is within the range of about 5 to about 30 phr.

* * * * *